Dec. 21, 1965     T. J. ROSS     3,224,523
THREE-WHEELED MOTOR VEHICLE
Filed Jan. 30, 1963     4 Sheets-Sheet 1
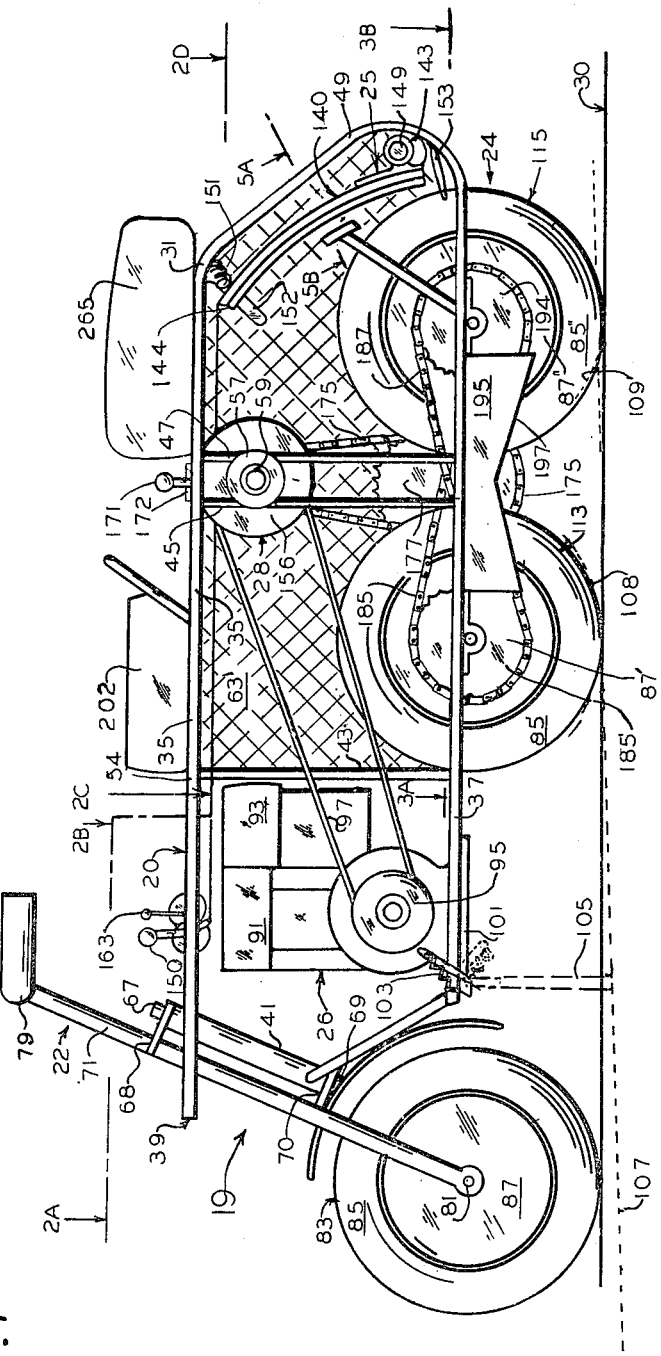
FIG. I
INVENTOR.
TRAVIS JUNIOR ROSS
BY *Ely Silverman*
ATTORNEY Dec. 21, 1965   T. J. ROSS   3,224,523
THREE-WHEELED MOTOR VEHICLE
Filed Jan. 30, 1963   4 Sheets-Sheet 2
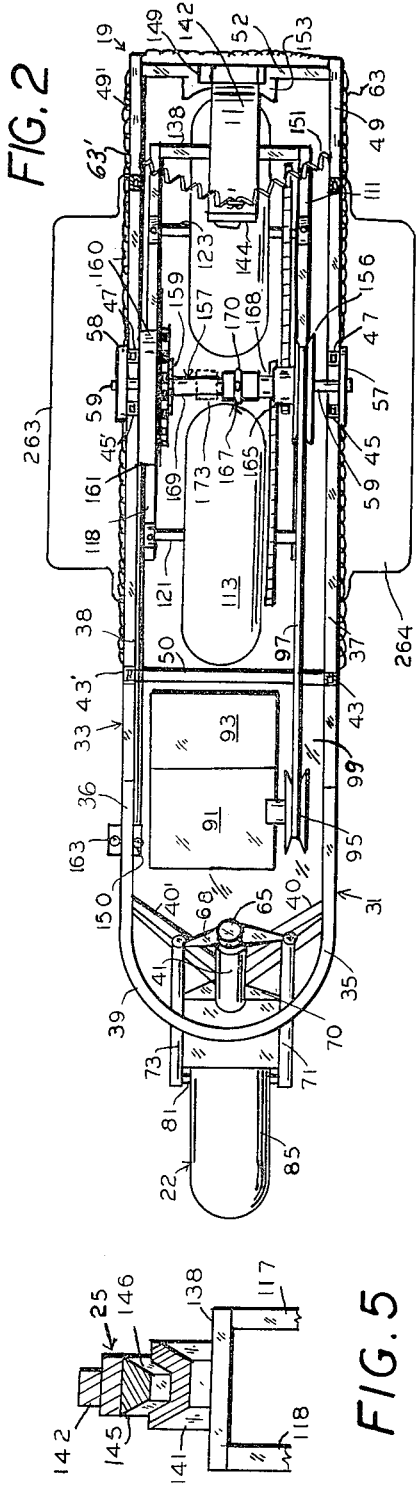
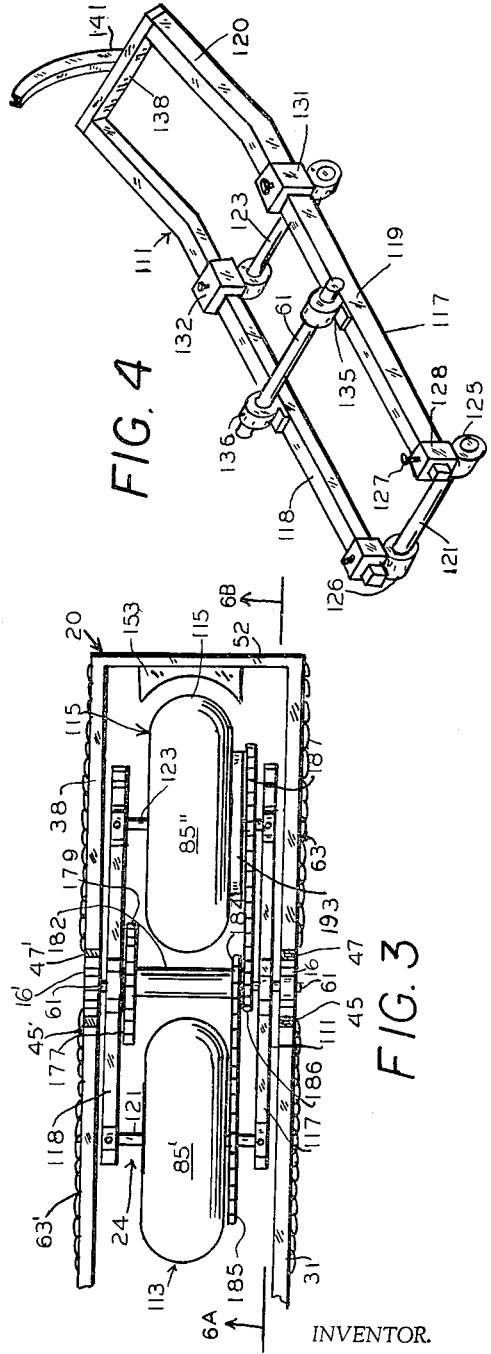
INVENTOR.
TRAVIS JUNIOR ROSS
BY Ely Silverman
ATTORNEY INVENTOR.
TRAVIS JUNIOR ROSS
BY Ely Silverman
ATTORNEY Dec. 21, 1965  T. J. ROSS  3,224,523
THREE-WHEELED MOTOR VEHICLE
Filed Jan. 30, 1963  4 Sheets-Sheet 4
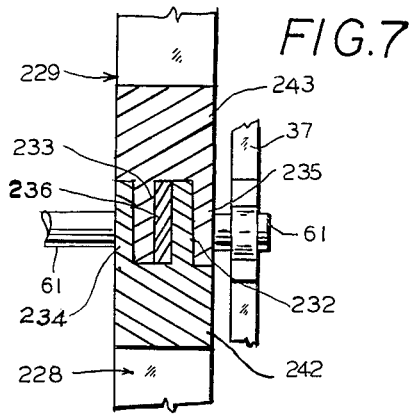
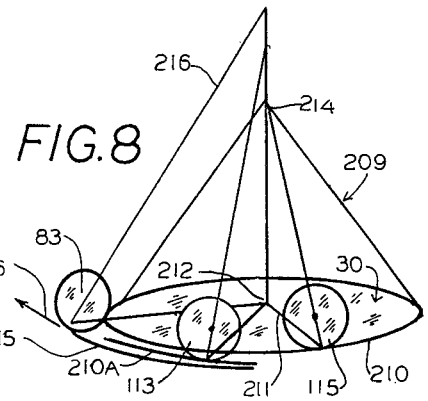
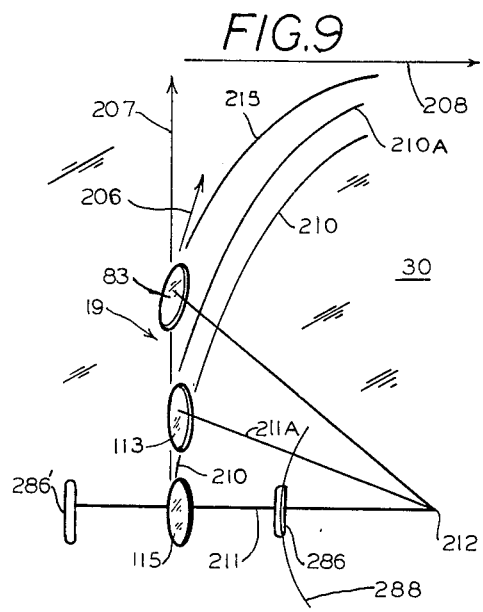
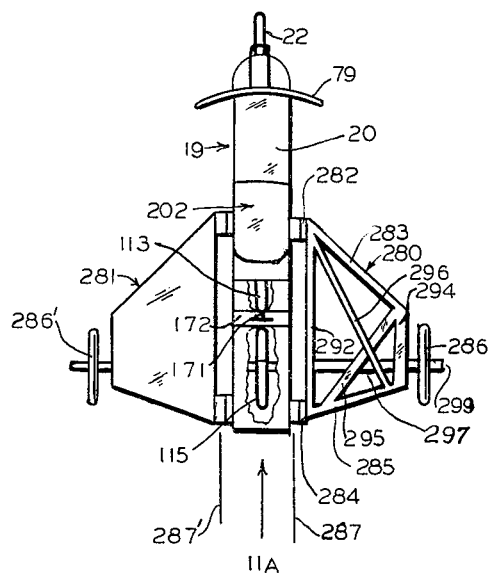
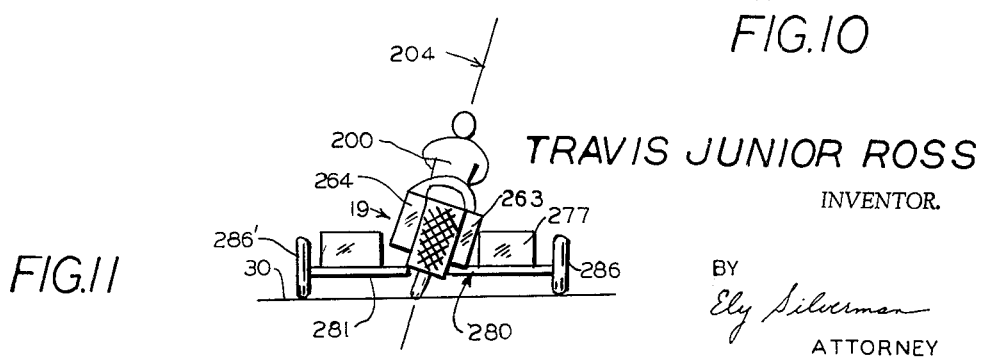
TRAVIS JUNIOR ROSS
INVENTOR.
BY
Ely Silverman
ATTORNEY

United States Patent Office 3,224,523
Patented Dec. 21, 1965

3,224,523
THREE-WHEELED MOTOR VEHICLE
Travis Junior Ross, Stinnett, Tex., assignor to Ross Craft Manufacturers, Stinnett, Tex.
Filed Jan. 30, 1963, Ser. No. 254,936
4 Claims. (Cl. 180—25)

This invention relates to a powered wheeled vehicle with two tandem driving wheels and one pivotable steering wheel and various improvements thereto.

One object of this invention is to provide a vehicle which is not only adapted for reliable straight-line transportation over rough terrain but also readily and controllably maneuverable.

Another object of this invention is to provide a three-wheeled vehicle having two powered driving wheels in tandem and one steering wheel and so arranged that at least two wheels always maintain contact with the ground.

Yet another object of this invention is to provide a personnel and cargo carrier vehicle adapted for reliable straight line travel over rough terrain and also controllably maneuverable.

Other objects of this invention will become apparent to those skilled in the art on study of the below description, of which description the accompanying drawings form a part and in which drawings the same numerals refer to the same structures in all said drawings and wherein:

FIGURE 1 is a left side view, partly broken away, of a device constructed according to this invention in operative position on horizontal ground;

FIGURE 2 is a cross-sectional view taken along the horizontal sections indicated by the stepped flat surfaces 2A–2B–2C–2D of FIGURE 1;

FIGURE 3 is a horizontal sectional view taken along the plane 3A–3B of FIGURE 1;

FIGURE 4 is a perspective view of the rear drive wheel support frame 111;

FIGURE 5 is an enlarged cross-sectional view along the plane 5A–5B of FIGURE 1;

Figure 6:
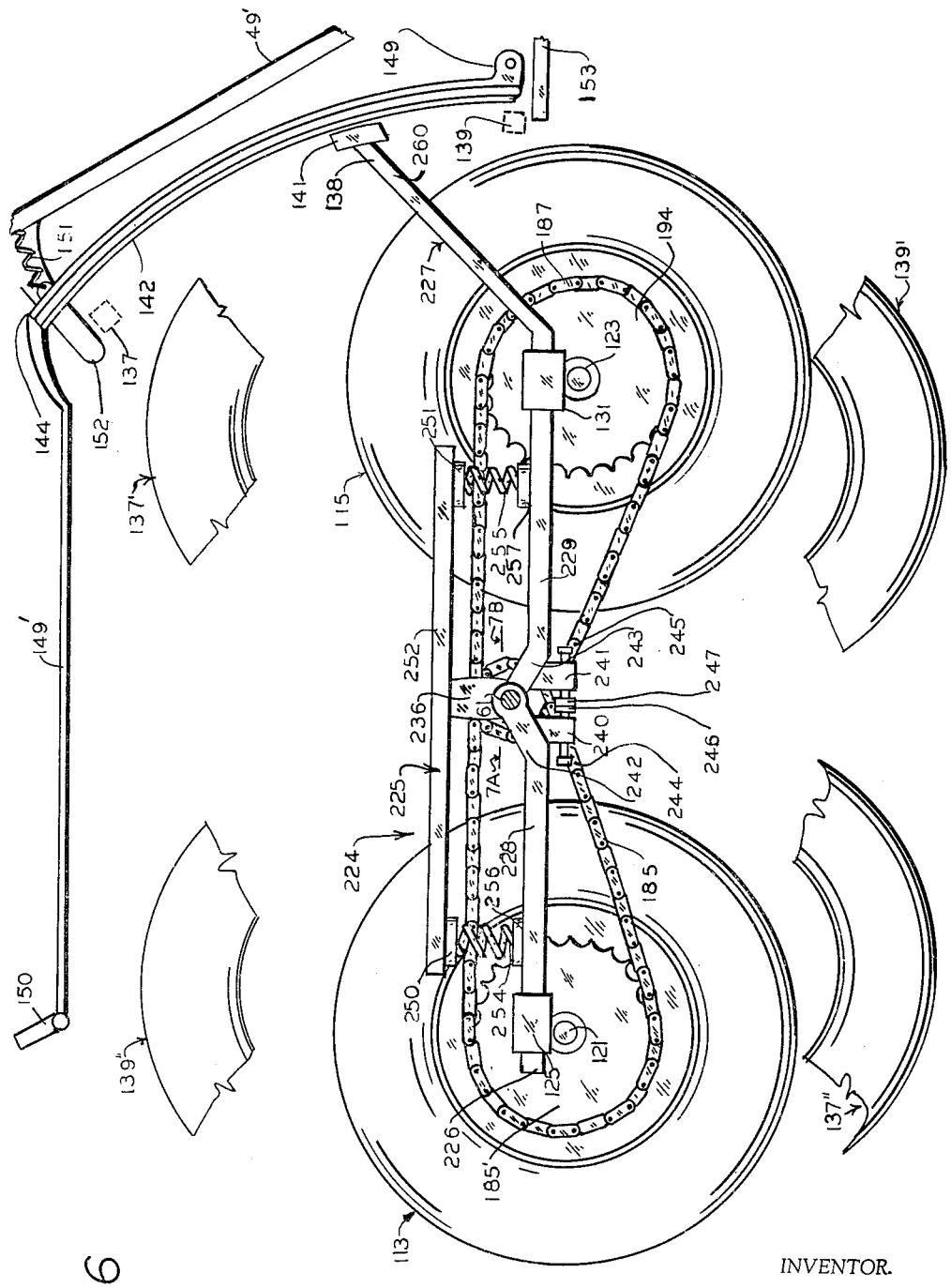

FIGURE 6 is a vertical sectional view of another embodiment of a pivotal rear wheel support frame subassembly such as 24 as viewed along a plane such as plane 6A–6B of FIGURE 3. This figure shows portions of this subassembly (portions 137' and 137'', 139' and 139'') in varied operative positions of such frame sub-assembly;

FIGURE 7 is an enlarged horizontal section view along section 7A–7B of FIGURE 6;

FIGURE 8 is a diagrammatic perspective representation of the paths of the wheels of the device of FIGURE 1 during a turn thereof to the right;

FIGURE 9 is a diagrammatic top view of the paths of the wheels of the apparatus of FIGURE 10 during a turn thereof to the right;

FIGURE 10 is a top view of a modified apparatus according to this invention; and FIGURE 11 is a rear view of the aparatus of FIGURE 10 along the direction of the arrow 11A of FIGURE 10 during the turning of said apparatus to the right.

Generally, the apparatus of this invention shown in FIGURE 1 and generally shown as 19 in operative position on horizontal flat ground 30 comprises a main frame sub-assembly 20, a front wheel sub-assembly 22, a rotatable rear wheel support frame sub-assembly 24, a rear wheel frame pivot arresting sub-assembly 25, a motor sub-assembly 26, and a drive transmission sub-assembly 28. The main frame sub-assembly 20 supports one, movable, portion of a rear wheel frame pivot arresting sub-assembly 25 for the rotatable rear wheel support frame sub-assembly 24; the rotatable rear wheel support frame sub-assembly 24 carries the other portion of such pivot arresting sub-assembly. The pivot arresting sub-assembly 25 limits the motion of the sub-assembly 24 with respect to sub-assembly 20.

The main frame sub-assembly 20 comprises two parallel, spaced apart side frames, left side frame 31 and right side frame 33, that are mirror images of each other and firmly attached to each other. The left-hand side frame 31 shown to scale in FIGURE 1 comprises an upper horizontal frame member 35 and a lower horizontal frame member 37, firmly connected to each other by spaced apart central rigid vertical members 43, 45, and 47 and by sloped front end member 41 and sloped rear end member 49. The front member 41 is a hollow steel sleeve with its longitudinal axis sloped at 75° to the horizontal; the members 37 and 38 are, respectively, joined to the left and right sides thereof. Upper horizontal frame member 36 and lower horizontal frame member 38 of the right-hand frame 33 correspond to members 35 and 37, respectively, of frame 31 and are joined by vertical members 43', 45' and 47' corresponding to members 43, 45, and 47.

The upper frame members 35 and 36 form a U-shaped front guard element 39 at the front ends thereof, which guard wraps around the front of the sleeve 41. Bars 40 and 40' attach the members 35 and 36, respectively, to the upper end of the sleeve 41.

The vertical members 43, 45, and 47 are firmly welded at each of their tops and bottoms to the members 35 and 37, respectively. The rear member 49 is sloped downwardly and to the rear and firmly joined to the members 35 and 37. Members 36 and 38 are joined by a member 49' corresponding to member 49.

Rigid horizontal spacing members serve to hold the frame 31 and 33 in fixed spaced apart relation. Rigid horizontal spacing member 50 is provided at the junction of members 43 and 37 and extend to the corresponding bars 43' and 38 on the right-hand side frame. A cross-bar 52 is located at the middle of rear end bar 49 and extends to the corresponding bar 49' on the frame 38. A transverse bar (not shown and similar to bar 50) joins the members 35 and 36 at the juncture of bars 35 and at 43 and the juncture of bars 36 and 43'. Another transverse bar (not shown and similar to bar 50 is firmly located and attached to elements 35 and 36 to the rear of the attachment thereof to the vertical members 47 and 47', respectively. The vertical members 45 and 47 are affixed to and support an axle bearing plate 57 near the top of the left-hand side frame 31; a corresponding axle bearing plate member 58 is supported on the members 45' and 47' near the top of the right-hand side frame 33. The bearing plates 57 and 58 support the rotatable upper sprocket shaft 59 therebetween.

A lower sprocket support shaft 61 is firmly attached to and supported on the bar 37 between the attachment thereto of the bars 45 and 47. The other end of the shaft 61 is firmly attached to bar 38 between the attachments thereto of the vertical members 45' and 47'.

In the preferred embodiment all frame elements of side frames 31 and 33 are formed of ¾" square tube steel of ⅛" thick walls; the shafts 59 and 61 are ¾" diameter solid steel.

An expanded metal screen 63 is attached to the outside of the side frame sub-assembly 31 to avoid catching of extraneous elements in the moving parts contained within the outline of frame 20. A corresponding expanded metal sheet 63' is provided on the outside of the frame sub-assembly 33.

In the preferred embodiment frame sub-assembly 20 has an overall height from member 37 to 35 of 16 inches, an overall width of 11 inches from one side of frame subassembly 31 to the other side of frame sub-assembly 33, and an overall length of 60 inches from the rear of members 49 and 49' to the front of arms 71 and 73 at their bottom ends.

The front wheel sub-assembly 22 comprises a solid steel cylindrical pivot shaft 65 which extends through and smoothly and slidably fits within the sleeve 41. At the top end 57 and the bottom end 69 of the shaft 65 the shaft 65 is attached to each of two tubular front wheel yoke arms 71 and 73 (¾" O.D. ⅛" thick wall steel tubing in the preferred embodiment); a triangular steel plate 68 is welded to the top 67 of the shaft 65 and to wheel yoke arms 71 and 73 which are parallel to said shaft. A similar plate 70 is similarly attached to the bottom end 69 of shaft 65 for similar attachment thereof to the portion of arms 71 and 73 adjacent thereto. A 2 foot wide steering handle 79 is firmly attached to the top of the arms 71 and 73 by welding. A front wheel axle 81 is firmly attached to and supported between the bottom ends of each of arms 71 and 73. A front wheel 83 is rotatably supported on said axle. In the preferred embodiment, this wheel 83 comprises a 400 x 8 pneumatic tire, 85, on a steel frame 87.

The motor sub-assembly 26 comprises a standard 4 h.p. air cooled internal combustion gasoline engine motor 91 with a gas tank 93 and a constant torque clutch 95 for driving a standard V-belt 97. The motor is supported on a platform 99, which platform is firmly attached at either of its sides to the lower frame members 37 and 38, respectively. A rectangularly U-shaped kick stand 101 with a flat horizontal bottom portion is pivotally attached to the bottom of the frame members 37 and 38 and provided with a snap spring 103 to hold it in either the raised or lowered position. The raised position is shown at 101 in FIGURE 1 in full lines, and, at 105, in dotted lines in the lowered operative kick stand position for the device, with the horizontal ground then shown in dashed line 107 and the bottom portions of wheels 113 and 115 shown by dashed and dotted lines 108 and 109, respectively, to show the relative positions of the device 19 and ground in the lowered operative position of the kick stand.

The rear wheel support frame sub-assembly 24 comprises a rectangular frame 111, a front drive wheel 113 and a rear drive wheel 115. Each such wheel 113 and 115 is formed, in the preferred embodiment, of a 400 x 8 pneumatic tire 85' and 85" and a wheel frame 87' and 87", respectively, as on wheel 83.

The frame 111 comprises a left side member 117 and a right side member 118. These members 117 and 118 are mirror images of each other and are formed of 1" square ⅛" thick steel tubing in the preferred embodiment.

The left side member 117 is formed of a straight portion 119, 20" long in embodiment 19 and an upwardly and rearwardly angled portion 120 which is 7" long in embodiment 19. A sturdy ¾" diameter cylindrical steel front drive wheel support shaft 121 supports the front drive wheel 113; a similar rear drive wheel support shaft 123 supports the rear drive wheel 115. The front shaft 121 is supported at its lateral ends in adjustably located brackets 125 and 126 on frame elements 117 and 118, respectively. Each of these brackets is provided with a square-shaped steel section as 128 and locking screw as 127 threaded therethrough for slidable adjustment and positioning along the element 117. Corresponding brackets 131 and 132 are provided for the rear shaft 123 and are, respectively, attached to the frame elements 117 and 118. Journals 135 and 136 are firmly fixed to the top of the elements 117 and 118, half-way between the shafts 121 and 123, respectively. Lower sprocket support shaft 61 smoothly yet rotatably fits in and passes through journals 135 and 136 and, at its ends, is supported on bars 37 and 38 in clamps 16 and 16' respectively. Thereby frame 111 is rotatably or pivotally supported on shaft 61. Cross piece bar 138 which, in the preferred embodiment, is 9" from one outside edge to the other outside edge thereof is welded to the rear ends of the elements 117 and 118.

The rear wheel frame pivot sub-assembly 25 is provided to prevent rotation of the sub-assembly 24 with respect to the frame sub-assembly 20, when desired. Sub-assembly 25 comprises a main frame movable brake shoe sub-assembly 140 and a pivotal frame brake shoe 141. Sub-assembly 140 comprises an elongated rigid curved steel backing plate 142 hingedly attached at is lower end 143 by hinge 149 to the bar 52 and is resiliently supported at its upper end 144. Plate 142 thus may rotate about hinge 149 in a plane normal to the axis of shaft 61. Plate 142 firmly supports on its front surface 145 a section of V-belt 146. A brake plate shoe 141 with a cross-section that matches that of belt 146 is firmly attached to the cross-piece bar 138 and closely fits belt 146 when the plate 142 is pivoted forward (counterclockwise in FIGURES 1 and 6) about its hinged connection 149 with bar 52 by the pivot arresting lever 150. The lever 150 is attached by cable 149' to upper end 144 of plate 142 and is supported on frame member 36. Brake lever 150 opposes the action of spring 151, a V-shaped spring attached to the upper end 144 of the plate 42 and to the upper ends of the bars 49 and 49' (as per FIGURES 1 and 6). When the plate 142 is in its normal rearward position, held in place by spring 151, it does not contact frame 111. However, limit lugs 152 and 153, adjacent the top and bottom ends of plate 142, respectively, serve as snubbing means to limit the maximum rotation of frame 111 relative to frame 20 by engagement with the crosspiece bar 138 when said bar is at its upper (137) and lower (139) limits of travel as shown in FIGURE 6 in dotted lines. Shoe 141 is located halfway between the upper and lower ends of plate 142 in the position of frame 111 shown in FIGURE 1 wherein all wheels—83, 113 and 115—are at the same vertical level.

The drive transmission sub-assembly 28 comprises the V-belt 97 which is attached to pulley wheel 156 rotatably supported on the upper sprocket shaft 59. The pulley wheel 156 is firmly attached to and supported on the left-hand portion 168 of the rotatable split sleeve 157. Shaft 59 is supported at one end on the bearing plate 58 and on the other end on the bearing plate 57. The pulley wheel is located in embodiment 19 on the left-hand side of the left-hand portion 168 of the sleeve 157 and operatively connected thereto by an overload release spring clutch 165. On the right-hand side 169 of the sleeve between the lateral position of the wheels 115 and 113 and the internal boundary of the element 118 of frame 111 a 3 inch diameter 12-tooth sprocket wheel 159 is firmly attached to the right-hand portion 169 of sleeve 157 by keying. A brake drum 160 is also attached to the sleeve 157 lateral of the sprocket wheel. A brake band 161 surrounds the drum 160 and is spaced away therefrom. The band 161 is attached at one end to the frame 33 and at the other end to a brake toggle lever 163.

The split sleeve 157 is splined at its center and there cut; a sliding and locking splined sleeve 167 is provided to act as a clutch to join the centrally splined left end 168 of the sleeve 157 with the centrally splined right end 169 of the sleeve 157. A yoke 170 supported on a slot in a plate 172 on frame 20 is actuated by a handle 171 to move said yoke to the left or right and so move the slidable locking sleeve 167 into position 173 shown in dotted lines in FIGURE 2 where the sleeve unlocks element 168 from 169 or, as shown in full lines in FIGURE 2, at 167 to the position whereat the two sections 168 and 169 of the sleeve 157 are caused to rotate together.

The upper sprocket wheel 159 is connected by a drive chain belt 175 to a 12 inch diameter 48-tooth sprocket wheel 177 rotatably supported on the lower sprocket support shaft 61. The lower sprocket wheel 177 is a part of a lower sprocket wheel sub-assembly 179 comprising the sprocket wheel 177, a sprocket wheel sleeve 182 and two 3 inch diameter 12-tooth sprockets 184 and 186. The sprocket wheels 177, 184 and 186 are all firmly joined to the sleeve 182. The sleeve 182 is firmly yet rotatably supported on axle 61 by needle bearings. The sprocket wheel 177 is on the right-hand side of the sub-assembly 179. The outer face of the sprocket wheel 177 is spaced away only ⅛" from the member 118. The sprocket 186 is similar ⅛" away from the other member 117. Thus, the chain 175 transmits power from the upper sprocket 159 to the lower sprocket 177 and the front wheel drive sprocket 184 which transmits power via chain 185 to a front wheel sprocket 185' which is directly attached to the frame 87' of the front drive wheel 113. The rear wheel drive sprocket 186 is attached by chain 187 to the rear wheel sprocket 194 which is directly attached to frame 85" of the rear drive wheel 115 but spaced away therefrom by the spacer 193 whereby the chains 185 and 187 are extended in planes parallel to each other and to the planes of rotation of sprocket wheels 184 and 186.

A skirt 195 is attached to the left-hand frame member 117 to minimize any catching of grass and twigs in sprocket wheels 184 and 186 and the chains 185 and 187. The downward vertical extension of this skirt, as shown by the edge 197, is slightly greater than the downward extension of the lower edge of the corresponding drive chains 185 and 187.

In the operation of embodiment 19 the motor 91 drives the constant torque clutch 95 and pulley wheel 156. Wheel 156, through the belt 97, drives the splined sleeve 167; the slidable splined sleeve 167 when engaged with sleeve 168 drives the splined sleeve 169 which drives the upper sprocket wheel 159, which drives the chain 175. This chain drives the larger sprocket 177 on the sleeve 182; this in turn drives the sprockets 184 and 186. These sprockets by the chains 185 and 187, respectively, drive the wheels 113 and 115 regardless of the angle the length of frame 111 makes with the horizontal.

A braking action is applied to the drive wheels 113 and 115 by tightening the brake band 161 on the drum 160; concurrent locking of the rotatable rear wheel frame sub-assembly 24 to frame 20 by the pivot arresting sub-assembly 25 provides for a limiting of any counterclockwise rotation of the sub-assembly 24 about the axle 61.

The sub-assembly 24 may rotate about the shaft 61 between the position corresponding to the upper position 137 of cross piece 138 against limiting lug 152 to the lower position 139, shown in dotted lines, against limiting lug 153 in order for the drive wheels to maintain contact with and traction on the ground on travel over rough off-the-road terrain.

The controllable movement of the backing plate member 142 controllably limits the counterclockwise rotation of the sub-assembly 24 when desired, as when going down hill and the vehicle is being stopped and when, during forward motion of vehicle 19, brake band 161 is tightened on drum 160 and prevents the rider from being thrown upward and forward on rapid deceleration of vehicle 19 by locking of wheel 113 on frame 24 and counterclockwise rotation of frame 24 about shaft 61. The adjustable clamps 125, 126, 131 and 132 provide for movement of the shafts 121 and 123 to take up slack in the chains 185 and 187 as needed.

In operation the wheels 113 and 115 each easily undergo 7" vertical displacement from the position of axles 121 and 123 being at the same vertical height as shown in FIGURES 1 and 6 to the position of wheel 115 being raised 7 inches to position 137' and wheel 113 lowered as shown in FIGURE 6 to position 137". Similarly frame 111 is readily rotated to where crosspiece bar 138 is at position 139 and wheel 113 is raised 7 inches to position 139" and wheel 115 is lowered to position 139'. These movements permit the bottom of tire 85' or 85" to be only 1 inch below the level of frame members 37 and 38. By virtue of this movement of wheels 113 and 115, vehicle 19 is capable not only of going over extremely rough terrain but also of climbing steps of 10" high and 10" wide. In the embodiment of vehicle 19 there is 18 inches between the closest points on the front wheel 83 and the front drive wheel 113; there is a 3 inch space between the closest points on the drive wheels 113 and 115. The motor, 91, is supported well to the front of frame 20 and has its weight largely on the front wheel. The movement upward of the wheel 113 and 115 permitted by this device of FIGURE 1 permits upward motion of 7 inches by wheel 113 or 115 and downward motion to the same amount in going over a bump. During this time, however, while the front wheel may go up to 7 inches, the back wheel remains on the ground, hence, the axle 61 will rise only 3½". This reduces the amount and severity of road shock suffered by the rider in riding this vehicle.

Four wheeled vehicles suffer severe twisting strains on off-the-road terrain and are accordingly expensive and heavy. In travel on off-the-road terrain, a series of oblique as well as transverse obstructions are met by the vehicle wheels. Such obstructions tend to cause two-wheeled vehicles to slide or turn sidewards because no substantial force exists to hold the steering wheels against sideward motion. In the devices according to this invention the rear wheels, 113 and 115, because of the rotatable poistioning of the rear wheel support sub-assembly 24, are each pressed against the road substantially independently of the other and of obstructions in the road during straight line travel of the device 19 in its vertical position and maintain the longitudinal axis and straight line forward direction of the vehicle even when the front wheel strikes and passes over oblique obstructions. This machine is intended primarily for off-the-road purposes and very readily handles 4, 6 and 8 inch bumps without losing contact with the ground and so provides for a firm and even ride. However, for turning as desired the device of this invention is constructed so that the center plane of the drive wheels may be readily tilted and, when tilted from the vertical, permit the device, as 19, to be readily turned left or right as desired.

The two-wheel tandem drive arrangement of the two rear drive wheels 113 and 115 holds the device 19 in straight line motion notwithstanding meeting any rocks or rough spots in the road which might otherwise tend to cause a vehicle to swerve when the central longitudinal plane 204 of frame 20 is vertical, as shown in FIGURE 1, and the front wheel 83 is held to operate and rotate in the same flat and vertical plane as that of the rear wheels. In a freak situation wherein the front wheel 83 was raised the device 19 ran 30 to 40 feet in a perfectly straight line when the device 19 was balanced with plane 204 in a vertical position although wheel 83 was completely off the ground.

In the embodiment of the apparatus of this invention hereinabove referred to as 19, without a rider and with the gas tank of the apparatus full, the weight distribution on the wheels of that apparatus in the position shown in FIGURE 1 is as follows: On the front steering wheels, 64 lbs., on the front drive wheel 113, 68 lbs., on the rear drive wheel 115, 68 lbs. When a 170 lb. rider as 200 sits on the seat 202, which seat is mounted on the top of frame 20 between members 43 and 45 and 43' and 45', said rider in normal erect sitting posture, there would be 121±2 lbs. (32.5±1% of total weight) on each of the drive wheels 113 and 115 and 130±2 lbs. (35%±1%) on the front wheel. When the rider moves forward in the normal relatively forward position holding the handlebar 79 assumed when a turn is made then 30%(±1%) of the total weight of vehicle and rider is borne on each of the rear wheels and 40%(±1%) on the front wheel.

The angular relationship of the longitudinal axis of the pivot shaft 65 for the front wheel to the horizontal longitudinal axis of the frame 20 provides, on turning of the front wheel to left or right during forward motion of the vehicle 19, for a horizontal component resisting motion of the vehicle 19 in the forward direction and so facilitating the turning of the vehicle.

In a preferred embodiment of the frame sub-assembly 24 of this invention, the frame shown generally as 224 in FIGURE 6 is substituted for the frame 24 in the device 19 shown in FIGURE 3.

This frame sub-assembly 224 comprises an upper, rigid H-shaped frame 225 and a lower frame sub-assembly 223 composed of two matching pivotally joined U-shaped elements 226 and 227. Front U-shaped element 226 comprises a horizontally extending left-hand side beam element as 228 and a mirror image right-hand side beam element on either side of the drive wheel 113. Each beam element, as 228, has fingers, as 232 and 234, which firmly yet rotatably encircle and hold on to the shaft 61 and the elements 226 and 227 pivot thereabout. A lug 236 extends downward from the center of beam 252 of frame 225 and also pivotally grips the shaft 61 near its left end while a similar lug (not shown) extends downward from the center of beam 252 and grips shaft 61 near its right end. The rear U-shaped arm 227 is composed of two horizontally extending matching side arms as 229 (not shown); left arm 229 (like right arm 228) is provided with fingers, as 233 and 235, which interdigitate with the fingers 232 and 234 of the arm 228 and also embrace the tongue 236. The arm is provided with a shoulder 240 and the arm 229 is provided with a shoulder 241 rigidly attached to the bottom of an angled portion thereof 242 and 243, respectively. Adjustment screws as 244 and 245, with hard elastic rubber end-pads 246 and 247, extend between the shoulders, meet, and provide a softened contact of these arms which also limits their rotation towards each other. Corresponding structures are provided on the right-hand side of the frames 225, 226 and 227.

The arm 228 is provided with a bracket 125 and the arm 229 is provided with a bracket 131 for the parallel axle shafts 121 and 123, respectively, for the wheels 113 and 115 as in the frame 11 above discussed. The H-shaped upper frame 225 is provided with upper spring shoes as 250 and 251 at the ends of both its arms 252 and a corresponding arm (not shown). The arms are each on different sides of the drive wheels 113 and 115. Arm 252 is located above arms 228 and 229. The upper ends of springs as 254, 255 are located in said shoes while the lower ends of such springs are located, respectively, in shoes as 256 and 257 supported on the arms 228 and 229, respectively. This arrangement provides a softening or spring action for the wheels 113 and 115. The right-hand sides of the frame sub-assemblies 225 and 223 are similar to those of the left-hand sides herein described and are mirror images thereof.

The arm 229 is provided with a rearwardly extending angled portion 260 identical with the member 120 of frame 111 and the right-hand side of the U-frame 227 has a corresponding portion angled respectively to its longitudinal member. The member 138 and the shoe 141 are otherwise identical with the similarly numbered elements of frame 111 above described and are attached to the rear of said portions 260 and 260'.

FIGURES 8 and 9 and 11 diagrammatically show the relationships of the wheels 83, 113 and 115, during turning of the device 19 on tilting of the central longitudinal plane of frame 20 and rotating the handlebars 79 about the pivot shaft 65 so that the line 206 of the path of the front wheel 83 is brought to a definite angle to the otherwise rectilinear path 207 of the vehicle 19.

Tilting to the right as shown in FIGURES 8 and 11 is necessary for a right-hand turn of the vehicle 19 not only to avoid the effects of centrifugal force which would otherwise topple the vehicle to the left on a right-hand turn but also, on tilting of the device to the right as shown in FIGURE 8 the rear wheel 115 may freely rotate about a circle 210 which is the projection of a right circular cone 209 on the ground 30 while front drive wheel 113 travels a concentric path of only slightly greater radius. The circular path 210 traversed by the wheel 115 has a radius 211 which is the distance of the point of contact of said wheel 115 on the ground from the vertical projection 212 on the ground 30 of the apex 214 of cone 209.

As shown in FIGURES 2 and 3 the diametral cross-section of tires 85 and 85" is generally circular and the tires 85' and 85" are about 4 inches wide. The pressure in those tires is about 28 p.s.i.g. and, as above described, each tire bears about 120 lbs., over an area of contact of only about 4.3 square inches, for a generally circular area of ground contact of about 2⅓ inch diameter.

In device 19 the motor 91 is located forward to provide such a substantial proportion of weight on the front or steering wheel that it will, especially on tilting in any one direction (right-hand in FIGURE 9) a sufficient torque—clockwise during a right-hand turn, as shown in FIGURE 9—to overcome any opposing torque—counter-clockwise during a right-hand turn—developed by the rear drive wheels. This assists in the ease of maneuverability of the device on turning. Also, the axis of shaft 65, about which the front steering wheel sub-assembly rotates, is not vertical but tilted forwardly and downwardly to minimize sliding sideways and so improve the effectiveness of grip of the contact of wheel 83 on the ground during a turn to the right or left.

The ability of the vehicle 19 to permit tilting of plane 204 to the left or right (as in FIGURE 11) permits the vehicle to be readily turned in spite of the ability of the tandem drive wheel structure of vehicle 19, when vertical, to overcome oblique obstructions to straight line travel. Tilting plane 204 to the right permits wheels 113 and 115 to be dragged to the right, but opposes any dragging thereof to the left. Thus, on a turn to the right, the rear wheel 115 rotates about circular path 210 which is the intersection of cone 209 with the ground 30 while wheel 113 slides over the concentric path, 210A, of slightly larger radius corresponding to the distance 211A from point 212 to the point of contact of wheel 113 with the ground. Tilting is readily permitted in device 19 because the centers of the bottoms of wheels 113, 115 and 83 contact the ground 30 on the same straight line during straight line forward motion of device 19 and the center planes of wheels 113, 115 and 83 are all located, as shown in FIGURE 2, in the center plane of frame 20. The center planes of wheels 83, 113 and 115 all lie in the same flat plane, which feature permits turning with equal ease to right or left.

The relations of vehicle 19 and the ground are for turning to the right as shown as FIGURES 8, 9 and 11: In this tilted position front wheel 83 is at a somewhat greater distance from the central axis point 212 than are either of the ground contact points of wheels 113 and 115. The wheel 83 then travels in an arc 215 which is the generation on the plane of the ground 30 of a right circular cone 216 having its apex on the same vertical axis as the cone 209 about which the wheels 113 and 115 are rotated. Accordingly, by adjustably tilting the frame 20 a circular path of any desired diameter (over the minimum turning radius) is readily made. In the embodiment 19 where the distance between the center of the wheels 115 and 113 is 23 inches and the distance between the center of the front wheel 83 and the front driving wheel is 33 inches when operating in a straight line path, the device 19 may make a complete right angle turn, i.e. from a straight line path 207 to a straight line path 208 at right angles thereto, in a distance of 6 feet and may make a complete 180° or 360° turn within a circular area with a diameter of 10 feet.

Accordingly, the tilting of the vehicle allows a turning of that vehicle notwithstanding the tandem relationship of the two drive wheels. The radius of turning is at least in part determined, as far as the two rear wheels are concerned, by the angle of tilt of the vehicle. The front wheel 83 need only turn to such degree as to form an arcuate path as 215 which is consistent with the path of turning of the rear two wheels, i.e. the most vertical radius of the front wheel, the peripheral end of which radius contacts the plane of the ground during turning of the vehicle, the vehicle being tilted, lies in a conical surface of a cone 216, which cone has the same axis of rotation as the cone 209 about which the wheels 113 and 115 are rotated; accordingly, the front wheel provides a torque opposing that of the rear wheels and provides no opposition to the turning in path 210 permitted by the two rear wheels. When the end of the turn is desired, the front wheel is rotated back into alignment with that flat plane inclusive of the central longitudinal plane of the drive wheels, and plane 204 is made vertical by the rider balancing it to so straighten it: In that status the front wheel is positioned so that the length of its axle 81 is parallel to the length of axle shafts 121 and 123 and the motion of front wheel 83 on the ground is in a path along the same straight line as that along which the rear wheels 113 and 115 are directed.

For purposes of carrying additional luggage or baggage as 277 a rigid flat truss A-frame 280 may be pivotally attached on one side of the frame 20 by pivotal hinges 282 and 284. One side of each hinge as 282 is firmly attached along a straight and horizontal line 287 parallel to the length of frame 20 and adjacent to the rear lower side member 38 of the sub-assembly frame 20. The frame 280 comprises rigid front and rear members 283 and 285 joined by longitudinal members 292 and 294, truss members 295 and 296, and an axle support rod 297. The axle support rod supports the axle 299 of the outrigger wheel 286. The outrigger wheel 286 is located with its axis of rotation horizontal and the longitudinal central axis of the shaft 299 in the same flat vertical plane as that which includes the central axis of the shaft 123 of rear drive wheel 115 and radius 211 of cone 209. Thereby wheel 286 freely turns in a circular path 288 concentric with path 210 and does not interfere with the action of turning or with the stable travel in a straight line provided by the other three wheels 113, 115, and 83 as above described and as shown in FIGURES 9 and 11. The line of rotation 287 may be tilted slightly upward rather than being only horizontal to facilitate travel of the carrier over rough terrain.

A second outrigger carrier 281 may be attached on to the left side of frame 20. Carrier 281 is pivotally attached along a line 287' adjacent frame member 37 and is a mirror image of carrier 280 and otherwise structurally identical thereto. The outrigger wheel 286' for carrier 281 has its axis of rotation in the same flat vertical plane as axle 123 and the axis of rotation of wheel 286 when the vehicle 19 and carrier attachments 280 and 281 are traveling on a substantially flat horizontal surface or road. The carriers 280 and 281 may be readily detachable from frame 20 for purpose of carrying large amounts of luggage along relatively good roads and traveling without such additional carriers where the terrain is more irregular. Saddlebags as 263 and 264 may be carried on either side of frame 20 and attached firmly thereto as well as a luggage carrier as 265 on the rear of the top of frame 20.

Although, in accordance with the provision of the patent statutes, a particular preferred embodiment of this invention has been described in detail and the principles of the invention have been described in the best mode in which it is now contemplated applying such principles, it will be understood that the constructions shown and described are merely illustrative and that the invention is not limited thereto and, accordingly, alterations and modifications which readily suggest themselves to persons skilled in the art without departing from the true spirit of the disclosure hereinabove are intended to be included in the scope of the annexed claims.

I claim:
1. A vehicle comprising a main frame, two drive wheels arranged in tandem, a front steering wheel, said wheel rotatably mounted in a front steering wheel frame, a pivotal support for said front steering wheel frame, said support being firmly attached to said main frame, said steering wheel frame being pivotally yet firmly located in said support for pivotal movement about an axis of rotation, said steering wheel thus being pivotally and rotatably attached to said main frame, each of said drive wheels being rotatably supported on a separate axle, each of said axles being parallel and supported on a second, pivotal, frame and each of said drive wheels rotates in the same flat vertical plane, said axles each having a longitudinal axis, said axes each lying in a flat horizontal plane, pivotal supports fixedly attached on said main frame, said second, pivotal, frame pivotally supported on said pivotal supports, said pivotal supports providing an axis of rotation of said second, pivotal, frame parallel to the axles of said drive wheels, the support for said front steering wheel frame providing such wheel frame an axis of rotation which lies in the flat vertical plane of rotation of said drive wheels and which flat vertical plane is perpendicular to said flat horizontal plane in which the longitudinal axes of the axles for said drive wheels lie, and said axis provided by the support of said front steering frame is directed downwardly and forwardly, the plane of rotation of said drive wheels and of said steering wheel lying in the same flat vertical plane, motor means and a power transmission means supported on said main frame, a mechanical connection between the said power transmission means and said motor whereby said power transmission means is driven by said motor, a first mechanical connection from said power transmission means to one of said drive wheels and another mechanical connection from said power transmission means to the other of said drive wheels whereby each of said drive wheels is independently connected to said power transmission means and pivot arresting means comprising a first pivot arresting part attached to said second, pivotal, frame and a latter pivot arresting part attached to said main frame, said first part and said latter part being engageable with each other to thereby arrest the rotation of said pivotal frame with respect to said main frame, means attached to said latter pivot arresting part holding it spaced away from said first pivot arresting part normally, and movable control means attached to said main frame and to said latter pivot arresting part for moving said two pivot arresting parts into and out of operative contact.

2. Apparatus as in claim 1 wherein said first pivot arresting part comprises a first pivot arresting surface support means fixedly attached to one end of said pivotal frame and said latter pivot arresting part comprises, a second pivot arresting surface having a surface matching that of the first pivot arresting surface and firmly attached to a rigid support means therefor, said rigid support means being pivotally attached at one end thereof to said main frame, said movable control means being supported on the said main frame and attached to the other end of said second pivot arresting support means, said control means being movable and said second pivot arresting support means being movable therewith, and snubbing means are firmly attached to the main frame near the bottom and near the top of said main frame for engaging said pivot arresting surface support means attached to said one end of said pivotal frame at, respectively, its lower and its upper limit of rotation.

3. Apparatus as in claim 2 wherein said power transmission means for connecting said motor means to both said drive wheels comprises a first shaft rotatably supported on said main frame, said shaft supporting a pulley wheel on one side thereof connected to said motor, and, at the other side, a first drive sprocket wheel, a releasable clutch supported on said main frame and connecting said pulley and drive sprocket wheel, a second shaft which extends from one side of the main frame to the other and is supported on said main frame below the first sprocket wheel and rotatably supports said pivotal frame, a rotatable sleeve supported on said shaft and extending substantially the entire width of said pivotal frame, a second sprocket drive wheel firmly attached to the end of said sleeve below said first drive sprocket wheel, a drive chain operatively connecting said first sprocket wheel and said second sprocket wheel, and two adjacent drive sprockets of the same size at the other end of said sleeve, and there is a sprocket attached to said front drive wheel, one of said two adjacent sprockets being attached thereto by one drive chain, and there is a sprocket attached to the rear drive wheel of the same size as the sprocket on said other drive wheel and the other of said two adjacent drive sprockets being connected thereto by another drive chain, said drive wheels being of the same size and the axis of rotation of said second pivotal frame is parallel to the axles of said drive wheels and is halfway between said axles.

4. Apparatus as in claim 1 wherein the axis of rotation of said second pivotal frame is parallel to the axles of said drive wheels and is halfway between said axles, said second pivotal frame comprises a top frame comprising a left side member and, parallel thereto, a right side member, each located on opposite sides of said drive wheels, a transverse member connecting said left and right side members between said drive wheels, a tongue projecting vertically from the center of said left member and another tongue projecting vertically from the center of the right hand member, a lower pivotal frame comprising a front U-shaped member pivotally attached to the said tongues and a rear U-shaped member pivotally attached to said tongues, spring members between the rear U-shaped member and the top frame member, and spring members between the front U-shaped member and the top frame member, wheel axle supporting means on one end of each of said U-shaped members, the axle for said front drive wheel being attached to said front U-shaped member and the axle for the rear drive wheel being attached to said rear U-shaped member.

References Cited by the Examiner
UNITED STATES PATENTS

| | | | |
|---|---|---|---|
| 1,824,675 | 9/1931 | Linn | 280—203 |
| 2,260,798 | 10/1941 | Burns | 180—33 |
| 2,288,246 | 6/1942 | Kuester | 280—104.5 |
| 2,554,785 | 5/1951 | Leliter | 180—22 |
| 2,589,793 | 3/1952 | Franks | 180—33 |
| 2,712,856 | 7/1955 | MacPhee | 280—104.5 |
| 2,865,656 | 12/1958 | Musgrave | 280—203 |
| 2,898,965 | 8/1959 | Eddy | 305—35 |
| 2,934,157 | 4/1960 | Harp | 180—22 |
| 2,999,555 | 9/1961 | Stroud et al. | 180—19 |
| 3,077,238 | 2/1963 | Nelson | 305—57 |
| 3,099,460 | 7/1963 | Sheehan | 280—104.5 |
| 3,101,805 | 8/1963 | Tritle | 180—33 |

FOREIGN PATENTS 278,648  10/1930  Italy.

MILTON BUCHLER, *Primary Examiner.*

A. HARRY LEVY, KENNETH H. BETTS, *Examiners.*